(12) United States Patent
Kim

(10) Patent No.: US 8,558,775 B2
(45) Date of Patent: Oct. 15, 2013

(54) LIQUID CRYSTAL DISPLAY

(75) Inventor: Junghwan Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 30 days.

(21) Appl. No.: 13/344,518

(22) Filed: Jan. 5, 2012

(65) Prior Publication Data

US 2012/0105417 A1    May 3, 2012

Related U.S. Application Data

(62) Division of application No. 12/052,516, filed on Mar. 20, 2008, now Pat. No. 8,115,722.

(30) Foreign Application Priority Data

Jun. 28, 2007 (KR) ........................ 10-2007-0064479

(51) Int. Cl.
*G06F 3/038* (2013.01)
*G09G 5/00* (2006.01)

(52) U.S. Cl.
USPC ............. 345/98; 349/100; 349/113; 349/114; 349/115

(58) Field of Classification Search
USPC ............. 345/90–100, 204; 349/110, 113–115
See application file for complete search history.

(56) References Cited

U.S. PATENT DOCUMENTS

| | | | |
|---|---|---|---|
| 5,712,652 A | 1/1998 | Sato et al. | |
| 6,570,836 B2 | 5/2003 | Katayama et al. | |
| 6,750,836 B1 * | 6/2004 | Katayama et al. | 345/92 |
| 2002/0024508 A1 * | 2/2002 | Nakamura et al. | 345/204 |
| 2002/0130828 A1 * | 9/2002 | Yamazaki et al. | 345/80 |

FOREIGN PATENT DOCUMENTS

| | | |
|---|---|---|
| JP | 08-286170 | 11/1996 |
| JP | 2003-122331 | 4/2003 |
| KR | 10-2001-0023972 | 3/2001 |
| KR | 10-2002-0059226 A | 7/2002 |

OTHER PUBLICATIONS

KIPO Notice of Allowance dated Oct. 20, 2008, for Korean Patent application 10-2007-0064480, 4 pages.
Kipo Notice of Allowance dated Oct. 20, 2008, for Korean Patent application 10-2007-0064479, 4 pages.
U.S. Office action dated Sep. 13, 2011, for cross-reference U.S. Appl. No. 12/052,478, 20 pages.

* cited by examiner

*Primary Examiner* — Amr Awad
*Assistant Examiner* — Andre Matthews
(74) *Attorney, Agent, or Firm* — Christie, Parker & Hale, LLP

(57) ABSTRACT

A liquid crystal display having reduced power consumption. The liquid crystal display includes a liquid crystal display panel having a plurality of pixels and a plurality of pixel memories. A pixel voltage is stored in a pixel memory in an on screen display (OSD) region of the liquid crystal display panel for displaying a still image for a long period of time and driving a liquid crystal cell by the stored pixel voltage. Also, the power consumption of the liquid crystal display can be reduced by using a NAND gate or a NOR gate as a circuit element for alternating a voltage between low level and high level so as to store a pixel voltage in a pixel memory of the liquid crystal display.

7 Claims, 13 Drawing Sheets

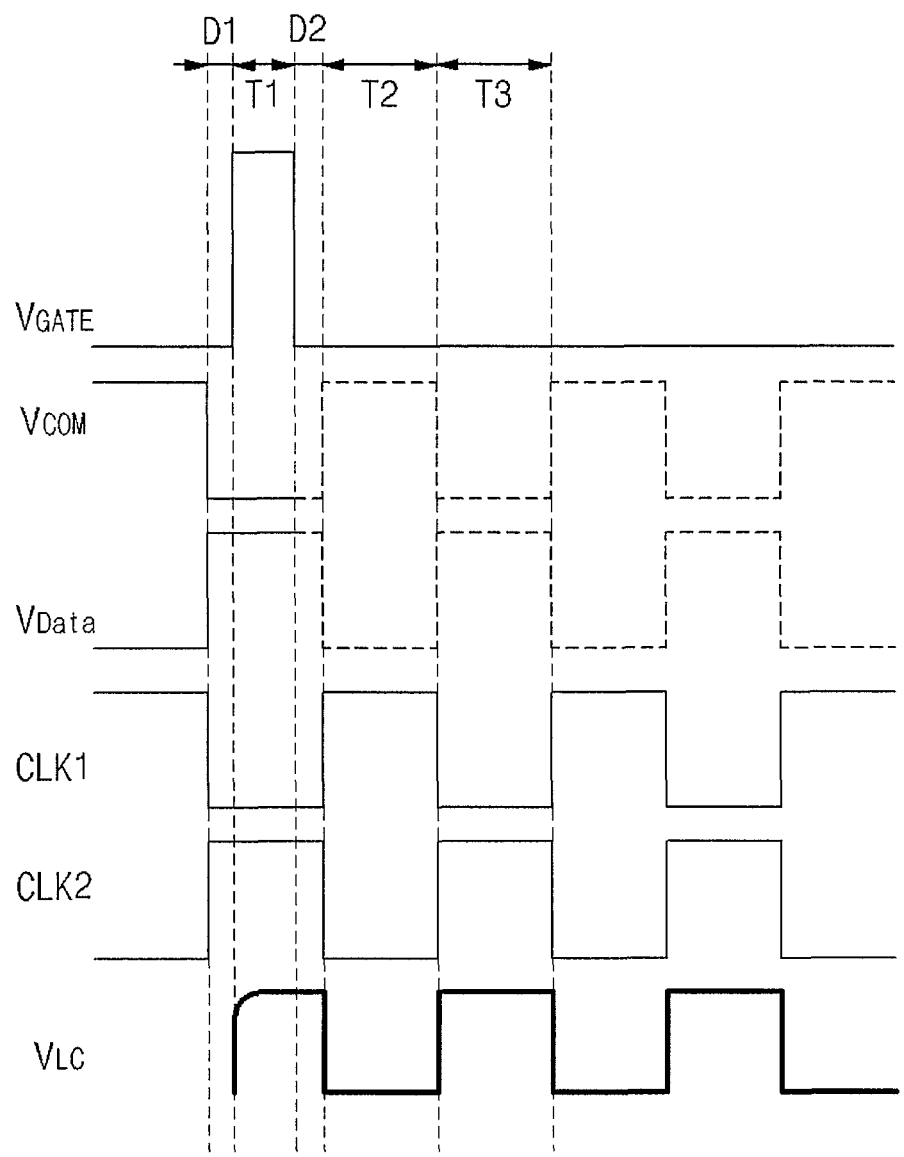

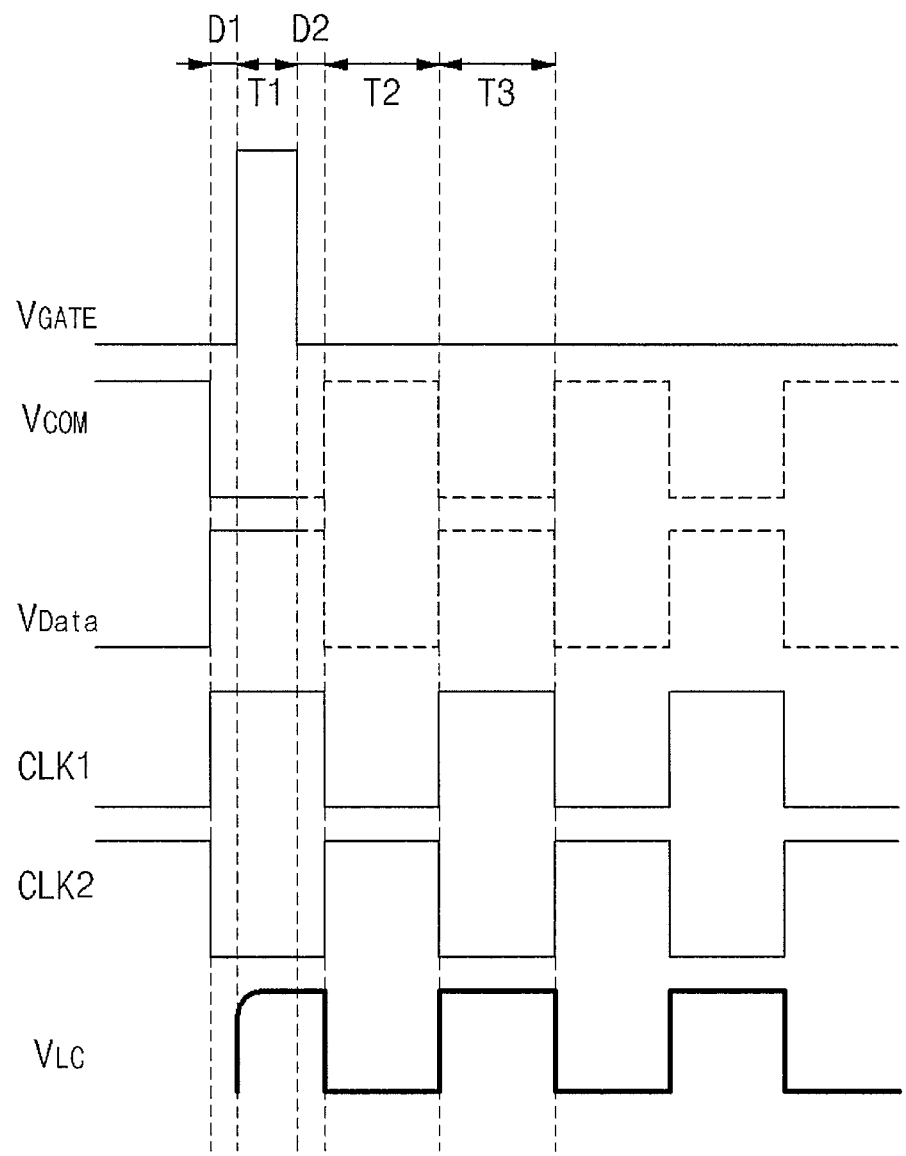

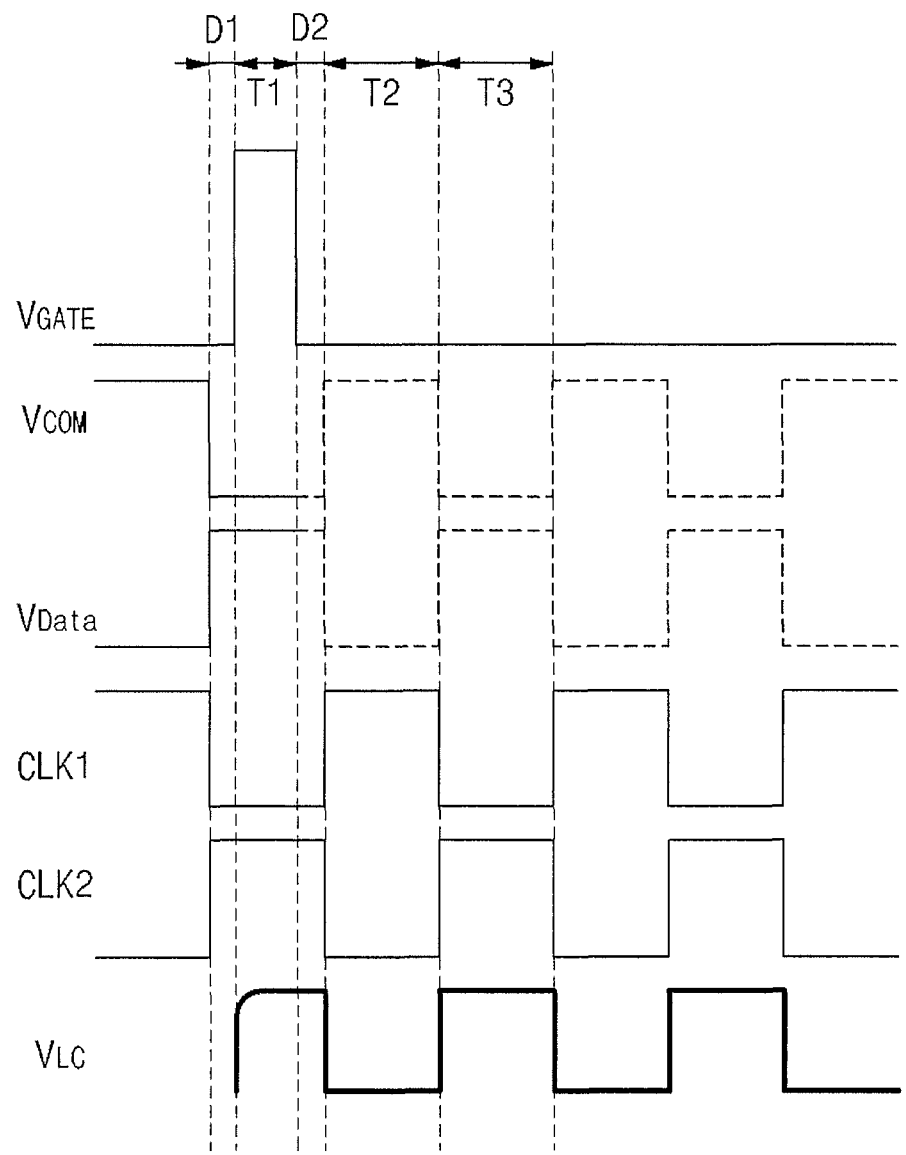

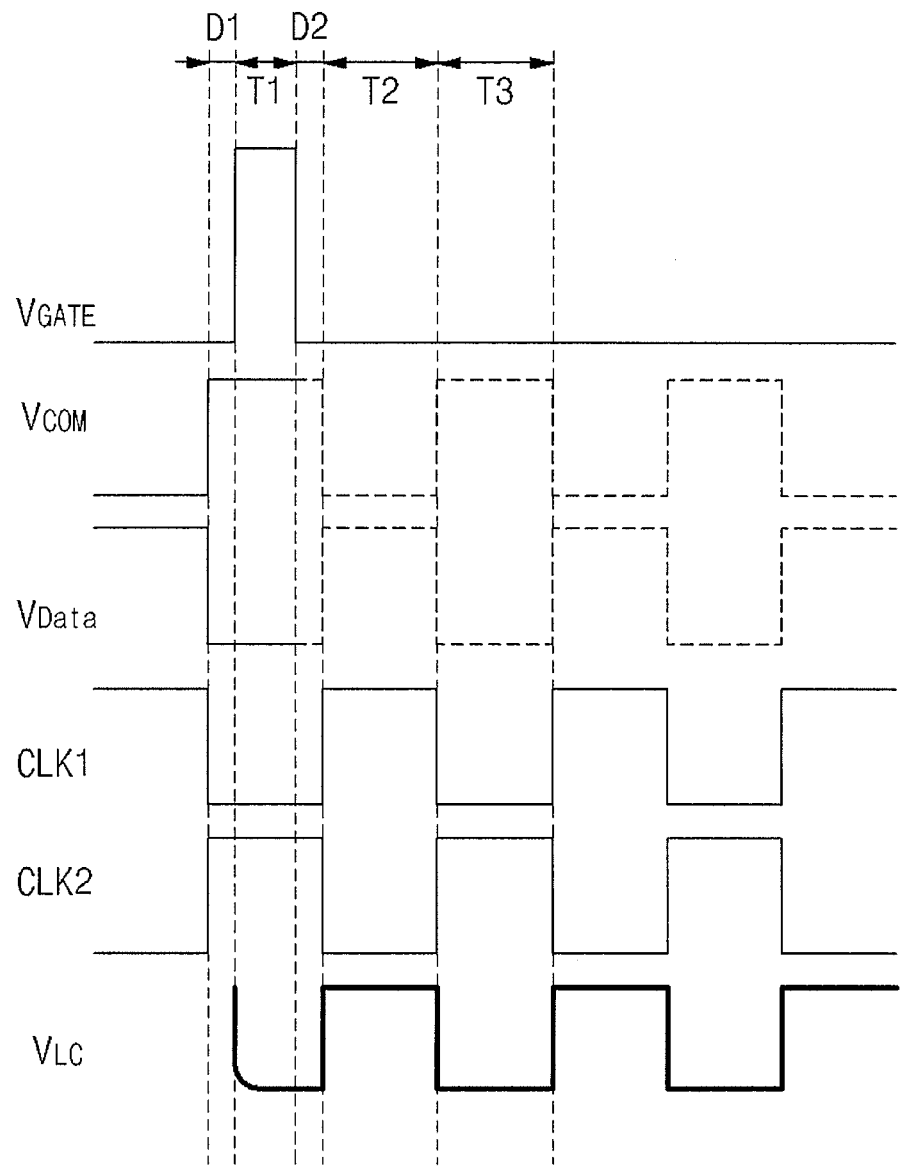

LIQUID CRYSTAL DISPLAY

CROSS-REFERENCE TO RELATED APPLICATIONS

This application is a divisional of U.S. patent application Ser. No. 12/052,516, filed Mar. 20, 2008, now issued as U.S. Pat. No. 8,115,722, which claims priority to and the benefit of Korean Patent Application No. 10-2007-0064479, filed Jun. 28, 2007, the entire content of both of which is incorporated herein by reference.

BACKGROUND

1. Field of the Invention

The present invention relates to a liquid crystal display, and more particularly, to a liquid crystal display having reduced power consumption.

2. Description of the Prior Art

As an information-oriented society has been developing in recent years, electronic devices such as personal computers and Personal Digital Assistants (PDAs) are widely used. Portable electronic devices that are suitable to be used in an office and outdoors are in demand, and thus they continue to become smaller and lighter. Liquid crystal displays are widely used to meet the requirements for producing battery powered smaller, lighter and lower power consuming portable electronic devices.

Liquid crystal displays can be categorized as reflective liquid crystal display and transmissive liquid crystal display in accordance with a travel path of light used for image display. Reflective liquid crystal display reflects a light beam incident on the front side of a liquid crystal panel by the rear side of the liquid crystal panel and visualizes an image by the reflected light, and transmissive liquid crystal display visualizes an image by the transmitted light from a light source (e.g., backlight) provided on the rear side of a liquid crystal panel to the front side of the liquid crystal panel. The visibility of a reflective liquid crystal display is poor because the quantity of reflected light is not constant due to varying environmental conditions, and thus a transmissive color liquid crystal display using a color filter is generally used as a display device of a personal computer displaying full-color.

Liquid crystal displays can also be categorized into TN (Twisted Nematic) liquid crystal displays and STN (Super-Twisted Nematic) liquid crystal displays in accordance with the driving method, and there are an active matrix display method using a switching element and a TN liquid crystal and a passive matrix display method using a STN liquid crystal.

A liquid crystal display using an active matrix drive method is widely used as a color display. Thin film transistors, which are included in a plurality of liquid crystal cells and used to switch and supply data voltages to the liquid crystal cells, are provided on a liquid crystal panel of an active matrix liquid crystal display. The liquid crystal cells are located at crossings of data lines and gate lines, and the thin film transistors are positioned on the crossings. The display quality of the active matrix liquid crystal display is better than that of a passive matrix liquid crystal display. However, because the active matrix liquid crystal display operates a driving circuit to operate the thin film transistors of the liquid crystal cells and transfer voltages, power consumption of the active matrix liquid crystal display is increased.

SUMMARY OF THE INVENTION

In one embodiment according to the present invention, a liquid crystal display is provided. The liquid crystal display includes a data driver, a gate driver and a liquid crystal display panel having a plurality of pixels and a plurality of pixel memories. Each of the plurality of pixel memories includes: a first NAND gate, a second NAND gate, a memory switching element, a first switching element and a second switching element. The first NAND gate has a first input terminal electrically coupled to a first voltage line and is configured to output an inverted voltage of a voltage applied to its second input terminal. The second NAND gate has a first input terminal electrically coupled to the first voltage line and is configured to receive at its second input terminal a voltage outputted from the first NAND gate to output an inverted voltage to its output terminal. The memory switching element is electrically coupled between the second input terminal of the first NAND gate and the output terminal of the second NAND gate. The first switching element is electrically coupled between the memory switching element and a pixel electrode. The second switching element is electrically coupled between the pixel electrode and an output terminal of the first NAND gate.

The first input terminal of the first NAND gate may be electrically coupled to the first voltage line. The second input terminal of the first NAND may be electrically coupled to a first electrode of the memory switching element, and the output terminal of the first NAND gate may be electrically coupled to the second input terminal of the second NAND gate and a first electrode of the second switching element.

The first NAND gate may be configured to output an inverted voltage of a voltage received from the memory switching element and transfer the voltage to the second input terminal of the second NAND gate and the first electrode of the second switching element.

The first input terminal of the second NAND may be electrically coupled to the first voltage line. The second input terminal of the second NAND may be electrically coupled to the output terminal of the first NAND gate and a first electrode of the second switching element. The output terminal of the second NAND gate may be electrically coupled to a first electrode of the first switching element and a second electrode of the memory switching element.

The second NAND gate may be configured to output an inverted voltage of a voltage received from the first NAND gate and transfer the voltage to the first electrode of the first switching element and the second electrode of the memory switching element.

The second NAND gate may be configured to output an inverted voltage of a voltage received from the first electrode of the second switching element and transfer the voltage to the second electrode of the memory switching element.

A control electrode of the memory switching element may be electrically coupled to a gate line. A first electrode of the memory switching element may be electrically coupled to the second input terminal of the first NAND gate. A second electrode of the memory switching element may be electrically coupled to the output terminal of the second NAND gate and a first electrode of the first switching element. The memory switching element may be configured to turn on when a low level gate voltage received from the gate line is applied to its control electrode and transfer a voltage received from the first switching element to the second input terminal of the first NAND gate.

The memory switching element may be configured to turn on when a low level gate voltage applied from the gate line is applied to its control electrode and transfer a voltage received from the output terminal of the second NAND gate to the second input terminal of the first NAND gate.

A first electrode of the first switching element may be electrically coupled to a second electrode of the memory switching element and the output terminal of the second NAND gate. A control electrode of the first switching element may be electrically coupled to a first clock line, and a second electrode of the first switching element may be electrically coupled to the pixel electrode.

The first switching element may be configured to turn on when a high level first clock voltage applied from the first clock line is applied to its control electrode and transfer a pixel voltage applied from the pixel electrode to the memory switching element.

The first switching element may be configured to turn on when a high level first clock voltage applied from the first clock line is applied to its control electrode and transfer a voltage outputted from output terminal of the second NAND gate to the pixel electrode.

A first electrode of the second switching element may be electrically coupled to the output terminal of the first NAND gate and the second input terminal of the second NAND gate. A control electrode of the second switching element may be electrically coupled to a second clock line, and a second electrode of the second switching element may be electrically coupled to the pixel electrode.

The second switching element may be configured to turn on when a high level second clock voltage applied from the second clock line is applied to its control electrode and transfer a pixel voltage applied from the pixel electrode to the second input terminal of the second NAND gate.

The second switching element may be configured to turn on when a high level second clock voltage applied from the second clock line is applied to its control electrode and transfer a voltage outputted from the output terminal of the first NAND gate to the pixel electrode.

The first switching element and the second switching element each may include an N-type transistor that is configured to turn on when a high level voltage is applied to its control electrode, and the memory switching element comprises a P-type transistor that is configured to turn on when a low level voltage is applied to its control electrode.

The first switching element, the second switching element and the memory switching element each may include a P-type transistor that is configured to turn on when a low level voltage is applied to its control electrode.

Each of the plurality of pixels include a liquid crystal cell, a storage capacitor and a pixel switching element. The liquid crystal cell has a first electrode electrically coupled to the pixel electrode and a second electrode electrically coupled to a common electrode. The storage capacitor is electrically coupled between the pixel electrode and the common electrode. The pixel switching element is electrically coupled between the pixel electrode and a data line and has a control electrode electrically coupled to a gate line.

The first electrode of the liquid crystal cell may be electrically coupled to the pixel electrode, a second electrode of the first switching element and a second electrode of the second switching element. And, the second electrode of the liquid crystal cell may be electrically coupled to the common electrode.

The first electrode of the liquid crystal cell may include the pixel electrode, and the second electrode of the liquid crystal cell may include the common electrode. A first electrode of the storage capacitor may be electrically coupled to the pixel electrode and the first electrode of the liquid crystal cell. A second electrode of the storage capacitor may be electrically coupled to the common electrode and the second electrode of the liquid crystal cell.

The storage capacitor may be configured to store an amount of charge corresponding to a voltage difference between its first electrode and its second electrode.

The control electrode of the pixel switching element may be electrically coupled to the gate line. A first electrode of the pixel switching element may be electrically coupled to the data line. A second electrode of the pixel switching element may be electrically coupled to the pixel electrode that is coupled to a first electrode of the storage capacitor and the first electrode of the liquid crystal cell.

The pixel switching element may be configured to turn on when a high level gate voltage applied from the gate line is applied to its control electrode and transfer a data voltage applied from the data line to the pixel electrode.

The pixel switching element may be configured to operate in opposite state as the memory switching element such that the memory switching element is configured to turn off when the pixel switching element is turned on, and the memory switching element is configured to turn on when the pixel switching element is turned off.

According to another embodiment of the present invention, a liquid crystal display is provided. The liquid crystal display includes a data driver, a gate driver and a liquid crystal display panel having a plurality of pixels and a plurality of pixel memories. Each of the plurality of pixel memories includes a first NOR gate, second NOR gate, a memory switching element, a first switching element, and a second switching element. The first NOR gate has a first input terminal electrically coupled to a ground and is configured to output an inverted voltage of a voltage applied to its second input terminal. The second NOR gate has a first input terminal electrically coupled to the ground, is configured to receive at its second input terminal a voltage outputted from the first NOR gate, and is configured to output to its output terminal an inverted voltage of a voltage outputted from the first NOR gate. The memory switching element is electrically coupled between the second input terminal of the first NOR gate and the output terminal of the second NOR gate. The first switching element is electrically coupled between the memory switching element and a pixel electrode. The second switching element is electrically coupled between the pixel electrode and an output terminal of the first NOR gate.

The first input terminal of the first NOR gate may be electrically coupled to the ground. The second input terminal of the first NOR gate may be electrically coupled to a first electrode of the memory switching element. The output terminal of the first NOR gate may be electrically coupled to the second input terminal of the second NOR gate and a first electrode of the second switching element.

The first input terminal of the second NOR gate may be electrically coupled to the ground. The second input terminal of the second NOR gate may be electrically coupled to the output terminal of the first NOR gate and a first electrode of the second switching element. The output terminal of the second NOR gate may be electrically coupled to a first electrode of the first switching element and a second electrode of the memory switching element.

A control electrode of the memory switching element may be electrically coupled to a gate line. A first electrode of the memory switching element may be electrically coupled to the second input terminal of the first NOR gate. A second electrode of the memory switching element may be electrically coupled to the output terminal of the second NOR gate and a first electrode of the first switching element.

A first electrode of the first switching element may be electrically coupled to a second electrode of the memory switching element and the output terminal of the second NOR gate. A control electrode of the first switching element may be electrically coupled to a first clock line. A second electrode of the first switching element may be electrically coupled to the pixel electrode.

A first electrode of the second switching element may be electrically coupled to the output terminal of the first NOR gate and the second input terminal of the second NOR gate. A control electrode of the second switching element may be electrically coupled to a second clock line. A second electrode of the second switching element may be electrically coupled to the pixel electrode.

Each of the plurality of pixels includes a liquid crystal, a storage capacitor and a pixel switching element. The liquid crystal cell has a first electrode electrically coupled to the pixel electrode and a second electrode electrically coupled to a common electrode. The storage capacitor is electrically coupled between the pixel electrode and the common electrode. The pixel switching element is electrically coupled between the pixel electrode and a data line and has a control electrode electrically coupled to a gate line.

BRIEF DESCRIPTION OF THE DRAWINGS

The above and other aspects and features of the present invention will be more apparent from the following detailed description taken in conjunction with the accompanying drawings, in which:

FIGS. 6a and 6b are timing diagrams of the pixel and the pixel memory of the liquid crystal display of FIGS. 2 and 5;

FIGS. 8a and 8b are timing diagrams of the pixel and the pixel memory of the liquid crystal display of FIGS. 2 and 7;

FIGS. 10a and 10b are timing diagrams of the pixel and the pixel memory of the liquid crystal display of FIGS. 2 and 9.

DETAILED DESCRIPTION OF EXEMPLARY EMBODIMENTS

Figure 1:
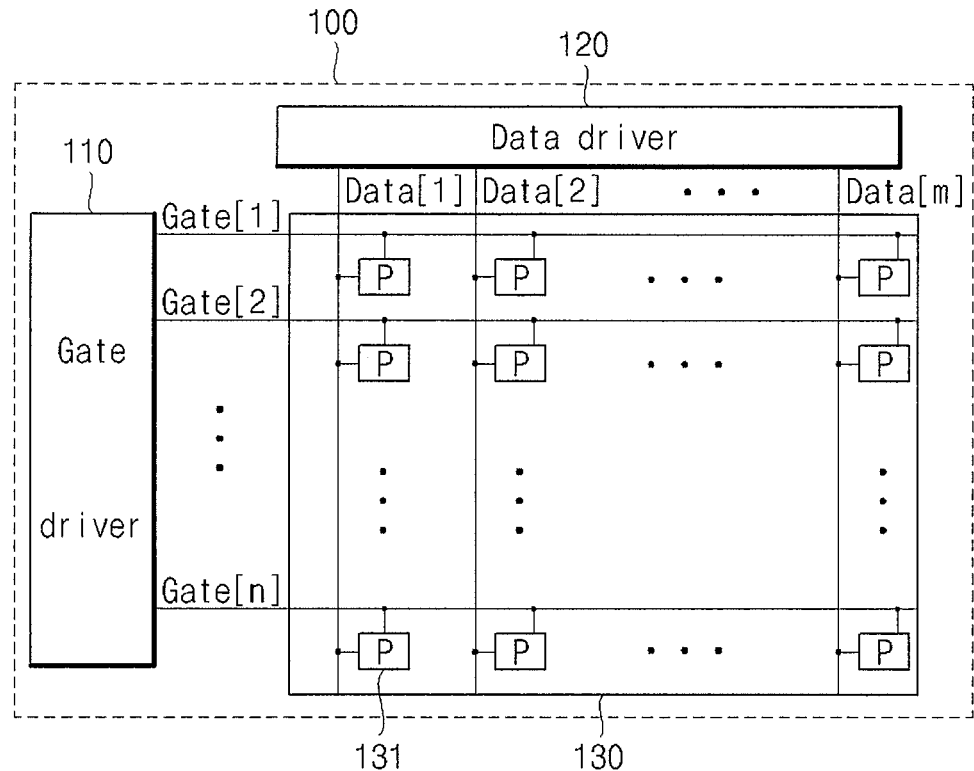
FIG. 1 is a block diagram illustrating a liquid crystal display according to an exemplary embodiment of the present invention.

Hereinafter, exemplary embodiments of the present invention will be described in detail with reference to the accompanying drawings.

Here, elements having same constitutions and operations are denoted by the same reference numeral. And, it should be understood that electrical coupling between a certain element and another element includes direct electrical coupling between them as well as indirect electrical coupling between them by an interposed element.

FIG. 1 illustrates a block diagram of a liquid crystal display according to an embodiment of the present invention.

As illustrated in FIG. 1, a liquid crystal display 100 includes a gate driver 110, a data driver 120 and a liquid crystal display panel 130.

The gate driver 110 supplies a gate voltage in sequence to the liquid crystal display panel 130 through a plurality of gate lines (Gate[1], Gate[2], . . . , and Gate[n]).

The data driver 120 supplies a data voltage sequentially to the liquid crystal display panel 130 through a plurality of data lines (Data[1], Data[], . . . , and Data[m]).

The liquid crystal display panel 130 includes the plurality of gate lines (Gate[1], Gate[2], . . . , and Gate[n]) extending in a horizontal direction, the plurality of data lines (Data[1], Data[], . . . , and Data[m]) extending in a vertical direction and a plurality of pixel circuits 131 located at crossings between the plurality of gate lines (Gate[1], Gate[2], . . . , and Gate[n]) and the plurality of data lines (Data[1], Data[], . . . , and Data[m]).

Here, each of the pixel circuits 131 can be formed in a pixel area defined by two adjacent gate lines and two adjacent data lines. As described above, the gate lines (Gate[1], Gate[2], . . . , and Gate[n]) can be supplied with a gate voltage from the gate driver 110, and the data lines (Data[1], Data[], . . . , and Data[m]) can be supplied with a data voltage from the data driver 120. And, each of the pixel circuits 131 includes a pixel and a pixel memory, and the pixel will be described in more detail with reference to FIG. 2, and the pixel memory will be described in more detail with reference to FIGS. 3 to 10.

Figure 2:
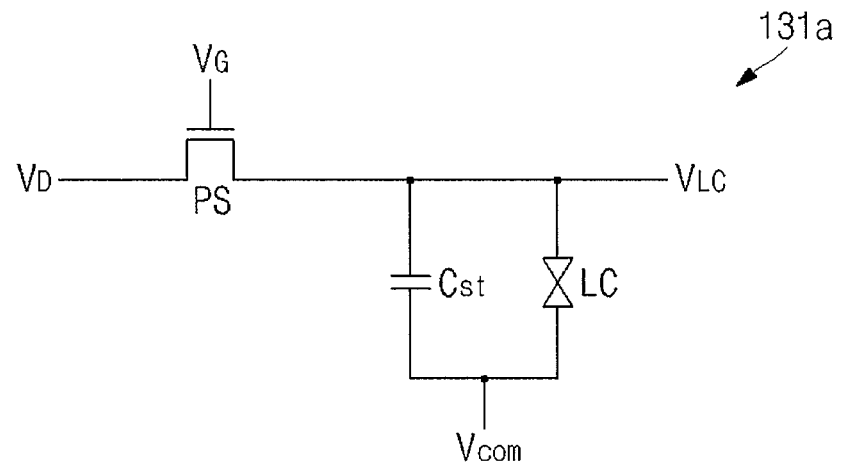
FIG. 2 is a circuit diagram illustrating a pixel of a liquid crystal display according to an exemplary embodiment of the present invention.

FIG. 2 illustrates a circuit diagram of a pixel 131a of a liquid crystal display according to an embodiment of the present invention.

As illustrated in FIG. 2, the pixel 131a of the liquid crystal display includes a pixel switching element PS, a liquid crystal LC cell and a storage capacitor $C_{st}$.

The pixel switching element PS includes a gate electrode electrically coupled to one of the gate lines (Gate[1], Gate[2], . . . , and Gate[n]) a first electrode (e.g., drain electrode or source electrode) electrically coupled to the one of the data lines (Data[1], Data[2], . . . , and Data[m]), and a second electrode (e.g., source electrode or drain electrode) electrically coupled to a pixel electrode $V_{LC}$. If a gate voltage having a high level is applied to the gate electrode, then the pixel switching element PS is turned on and transfers a data voltage applied from the data lines Data[1], Data[], . . . , and Data[m] to the pixel electrode $V_{LC}$.

The liquid crystal LC cell includes a first electrode electrically coupled to the pixel electrode $V_{LC}$ and a second electrode electrically coupled to a common electrode $V_{COM}$. When a data voltage is applied to the pixel electrode $V_{LC}$ and a common voltage is applied to the common electrode $V_{COM}$, the arrangement of liquid crystal molecules in a liquid crystal layer of the liquid crystal LC cell is changed by an electric field, so that the liquid crystal LC cell adjusts the quantity of light transmitted or blocked.

The storage capacitor $C_{st}$ includes a first electrode electrically coupled to the pixel electrode $V_{LC}$ and a second electrode electrically coupled to the common electrode $V_{COM}$. That is, the storage capacitor $C_{st}$ is connected in parallel with the liquid crystal LC cell. When the pixel switching element PS is turned on to apply a data voltage to the pixel electrode $V_{LC}$, the storage capacitor $C_{st}$ is charged an amount of charge corresponding to a voltage difference between the pixel electrode $V_{LC}$ and the common electrode $V_{COM}$. The amount of charge charged in the storage capacitor $C_{st}$ is supplied to the pixel electrode $V_{LC}$ for a period, during which a low level gate voltage is applied to the gate electrode of the pixel switching element PS to turn off the pixel switching element PS, to enable the driving state of the liquid crystal LC cell to be maintained. The amount of charge stored by the storage capacitor $C_{st}$ is determined by a voltage difference between the pixel electrode $V_{LC}$ and the common electrode $V_{COM}$.

Figure 3:
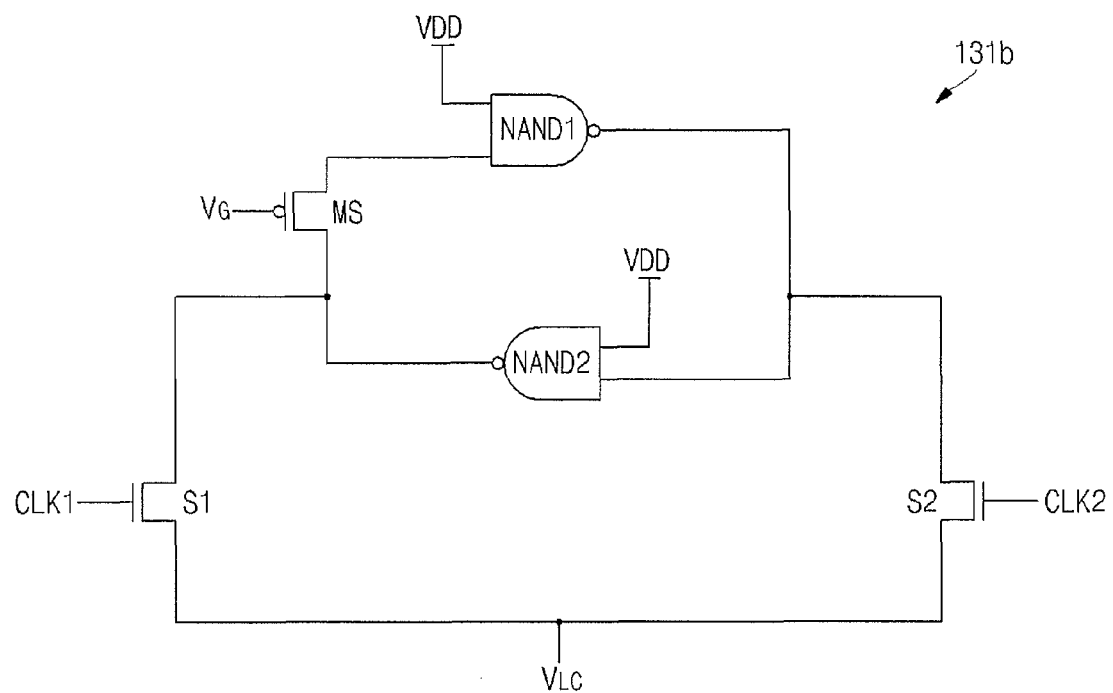
FIG. 3 is a circuit diagram illustrating a pixel memory of a liquid crystal display according to an exemplary embodiment of the present invention.

FIG. 3 is a circuit diagram illustrating a pixel memory of a liquid crystal display according to an embodiment of the present invention.

As illustrated in FIG. 3, a pixel memory 131b of a liquid crystal display includes a first NAND gate NAND1, a second NAND gate NAND2, a memory switching element MS, a first switching element S1 and a second switching element S2. A gate line that is electrically coupled to a control electrode (e.g., gate electrode) of the memory switching element MS is electrically coupled to a control electrode (e.g., gate electrode) of the pixel switching element PS of FIG. 2, and a pixel electrode $V_{LC}$ coupled to the first switching element S1 and the second switching element S2 is the same as the pixel electrode $V_{LC}$ coupled to the liquid crystal. LC cell and the storage capacitor $C_{st}$ of FIG. 2. That is, the pixel 131a of FIG. 2 and the pixel memory 131b of FIG. 3 are electrically coupled to each other. Here, the memory switching element MS is illustrated as a P-channel metal oxide semiconductor (PMOS) that turns on when a voltage having a low level is applied to its control electrode, and the pixel switching element PS is illustrated as an N-channel metal oxide semiconductor (NMOS) that turns on when a voltage having a high level is applied to its control electrode, but the embodiment is not limited thereto. The pixel switching element PS can be a PMOS when the memory switching element MS is an NMOS, and the pixel switching element PS can be an NMOS when the memory switching element MS is a PMOS, so that they operate in opposite states (i.e., on or off) when a gate voltage is applied from the gate line to their respective control electrodes.

When a still image is displayed for a long period of time or when the pixel 131a is located in an OSD region, the pixel switching element PS does not operate while the pixel memory 131b operates the liquid crystal LC cell by inputting and outputting a pixel voltage to the pixel electrode $V_{LC}$. At this time, other driving parts except the gate driver 110 that is electrically coupled to the pixel 131a do not operate because the pixel switching element PS of the pixel 131a does not operate, and thus power consumption is reduced.

The first NAND gate NAND1 includes a first input terminal electrically coupled to a first voltage line VDD, a second input terminal electrically coupled to a first electrode of the memory switching element MS, and an output terminal electrically coupled to a second input terminal of the second NAND gate NAND2 and a first electrode of the second switching element S2. The first NAND gate NAND1 outputs an inverted voltage of a voltage transferred from the memory switching element MS and transfers it to the second input terminal of the second NAND gate NAND2 and the first electrode of the second switching element S2. That is, the first NAND gate outputs a low level voltage to its output terminal when a high level voltage is applied to its second input terminal, and outputs a high level voltage to its output terminal when a low level voltage is applied to its second input terminal, and thus transfers its output voltage to the second input terminal of the second NAND gate NAND2 and the first electrode of the second switching element S2

The second NAND gate NAND2 includes a first input terminal electrically coupled to a first voltage line VDD and a second input terminal electrically coupled to the output terminal of the first NAND gate NAND1 and the first electrode of the second switching element S2, and an output terminal electrically coupled to the second electrode of the memory switching element MS and the first electrode of the first switching element S1.

The second NAND gate NAND2 outputs an inverted voltage of a voltage transferred from the first NAND gate NAND1 and transfers it to the second electrode of the memory switching element MS and the first electrode of the first switching element S1. That is, the second NAND gate NAND2 outputs a low level voltage to its output terminal when a high level voltage is applied to its second input terminal, and outputs a high level voltage to its output terminal when a low level voltage is applied to the second input terminal, and thus transfers its output voltage to the second electrode of the memory switching element MS and the first electrode of the first switching element S1.

Furthermore, the second NAND gate NAND2 outputs an inverted voltage of a pixel voltage transferred through the second switching element S2 and transfers it to the second electrode of the memory switching element MS. That is, the second NAND gate NAND2 outputs a low level voltage to its output terminal when a high level pixel voltage is applied to its second input terminal, and outputs a high level voltage to its output terminal when a low level pixel voltage is applied to its second input terminal, and thus transfers its output voltage to the second electrode of the memory switching element MS. When the memory switching element MS between the first NAND gate NAND1 and the second NAND gate NAND2 is turned on, a voltage between the first NAND gate NAND1 and the second NAND gate NAND2 alternates between high level and low level every time the voltage passes through one of the NAND gates. For example, when a high level voltage is applied to the second input terminal of the first NAND gate NAND1, the first NAND gate NAND1 outputs a low level voltage and applies it to the second input terminal of the second NAND gate NAND2, and the second NAND gate NAND2 outputs a high level voltage to its output terminal and applies it to the first NAND gate NAND1, and thus the voltage is alternated.

The memory switching element MS includes a control electrode electrically coupled to the gate line a first electrode electrically coupled to the second input terminal of the first NAND gate NAND1, and a second electrode electrically coupled to the output terminal of the second NAND gate NAND2 and the first electrode of the first switching element S1. The gate line is the same as the gate line applied to the pixel 131a of the liquid crystal display of FIG. 2, and a voltage that is the same as a gate voltage applied to the control electrode of the pixel switching element PS of the pixel 131a is also applied to the control electrode of the memory switching element MS.

The memory switching element MS is turned on when a low level gate voltage is applied to its control electrode to transfer a voltage outputted from the output terminal of the second NAND gate NAND2 to the second input terminal of the first NAND gate NAND1. Furthermore, the memory switching element MS transfers a pixel voltage transferred through the first switching element S1 to the second input terminal of the first NAND gate NAND1. That is, the memory switching element MS transfers a pixel voltage transferred from the first switching element S1 to the second input terminal of the first NAND gate NAND1 when the first switching element S1 is turned on. When the first switching element S1 is turned off and the memory switching element MS is turned on, a voltage between the first NAND gate NAND1 and the second NAND gate NAND2 is alternated.

The first switching element S1 includes a first electrode electrically coupled to the second electrode of the memory switching element MS and the output terminal of the second NAND gate NAND2, a second electrode electrically coupled to the pixel electrode $V_{LC}$, and a control electrode electrically coupled to a first clock line CLK1. The pixel electrode $V_{LC}$ is electrically coupled to the pixel electrode $V_{LC}$ of the pixel 131a of the liquid crystal display of FIG. 2 to apply a pixel voltage to the pixel electrode $V_{LC}$ c of the liquid crystal LC cell.

The first switching element S1 is turned on when a high level first clock voltage is applied to its control electrode to transfer a pixel voltage applied from the pixel electrode $V_{LC}$ to the memory switching element MS and transfer a voltage from the output terminal of the second NAND gate NAND2 to the pixel electrode $V_{LC}$. That is, the first switching element S1 inputs and outputs a pixel voltage to the pixel electrode $V_{LC}$. The first switching element S1 is enabled (i.e., turned on)when a high level clock voltage is applied to its control electrode. That is, the first switching element S1 may be an N-type transistor.

The second switching element S2 includes a first electrode electrically coupled to the output terminal of the first NAND gate NAND1 and the second input terminal of the second NAND gate NAND2, a second electrode electrically coupled to the pixel electrode $V_{LC}$, and a control electrode electrically coupled to a second clock line CLK2. The pixel electrode $V_{LC}$ is electrically coupled to the pixel electrode $V_{LC}$ of the pixel 131a of the liquid crystal display of FIG. 2 to apply a pixel voltage to the pixel electrode $V_{LC}$ of the liquid crystal LC cell.

The second switching element S2 is turned on when a high level second clock voltage is applied to its control electrode to transfer a pixel voltage applied from the pixel electrode $V_{LC}$ to the second input terminal of the second NAND gate NAND2 and transfers a pixel voltage applied from the output terminal of the first NAND gate NAND1 to the pixel electrode $V_{LC}$. That is, the second switching element inputs and outputs a pixel voltage to the pixel electrode $V_{LC}$. The second switching element S2 is enabled (i.e., turned on) when a high level clock voltage is applied to its control electrode. That is, the second switching element S2 may be an N-type transistor that is the same as the first switching element S1. In this NAND gate (e.g., NAND1 or NAND2), two N-type transistors connected in series within the NAND gate are electrically coupled to a ground, and thus a current flowing through the N-type transistors is reduced due to an ON resistance of the N-type transistors. Because a current flowing through the N-type transistors is reduced, power consumption of the NAND gate is less than that of an inverter.

Figure 4A:
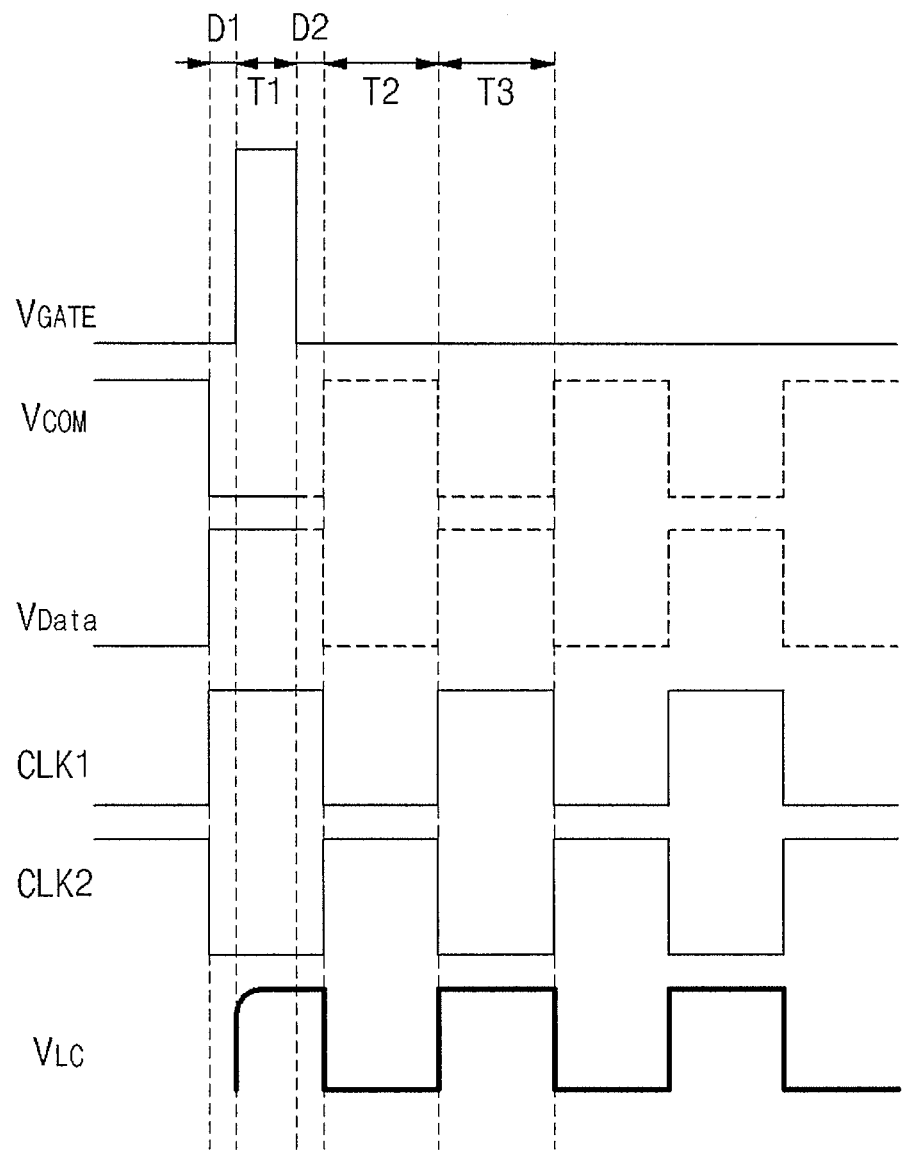
FIGS. 4a and 4b are timing diagrams of the pixel and the pixel memory of the liquid crystal display of FIGS. 2 and 3.
Figure 4B:
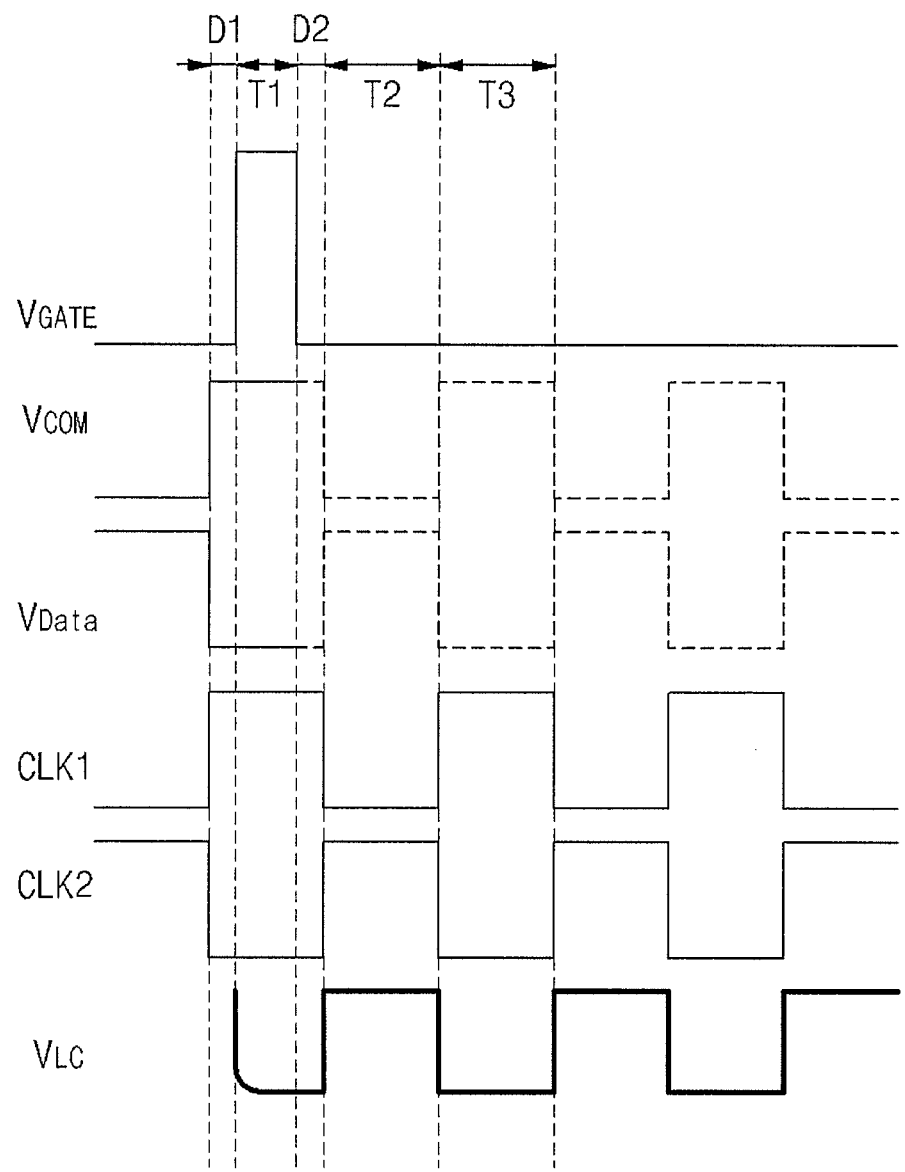

Referring to FIGS. 4a and 4b, timing diagrams of the pixel and the pixel memory of the liquid crystal display of FIGS. 2 and 3 are illustrated.

As illustrated in FIG. 4a, the timing diagram of the pixel 131a and the pixel memory 131b can include a first drive period T1, a second drive period T2 and a third drive period T3, and can further include a first delay period D1 and a second delay period D2.

First, in the first delay period D1, a low level gate voltage $V_{GATE}$ is applied to the pixel 131a and the pixel memory 131b, a low level common voltage $V_{com}$ and a high level data voltage $V_{DATA}$ are applied to the pixel 131a, and a high level first clock voltage and a low level second clock voltage are applied to the pixel memory 131b.

In the first delay period D1, a low level gate voltage $V_{GATE}$ is applied to the control electrode of the pixel switching element PS, so that the pixel 131a is turned off, and a low level gate voltage $V_{GATE}$ is applied to the control electrode of the memory switching element MS, so that the pixel memory 131b is turned on. The first switching element S1 of the pixel memory 131b is turned on when a high level first clock voltage is applied to its control electrode. Furthermore, the second switching element S2 is turned off when a low level second clock voltage is applied to its control electrode.

The first delay period D1 is a period during which a common voltage $V_{com}$ and a data voltage $V_{DATA}$ are constantly maintained, and a gate voltage $V_{GATE}$ is changed from low level to high level. This is for ensuring a margin to clock skew or delay.

Next, in the first drive period T1, a high level gate voltage $V_{GATE}$ is applied to the pixel 131a and the pixel memory 131b, a low level common voltage $V_{com}$, and a high level data voltage $V_{DATA}$ are applied to the pixel 131a, and a high level first clock voltage and a low level second clock voltage are applied to the pixel memory 131b.

The pixel switching element PS of the pixel 131a is turned on when a high level gate voltage $V_{GATE}$ is applied to its control electrode. When turned on, the pixel switching element PS transfers a high level data voltage $V_{DATA}$ applied from its first electrode to the pixel electrode $V_{LC}$. Here, a high level data voltage $V_{DATA}$ is applied to the pixel electrode $V_{LC}$, and a low level common voltage $V_{com}$ is applied to the common electrode Vcom, so that the liquid crystal LC cell can provide different gray levels by varying the arrangement state of a liquid crystal cell in accordance with a lateral electric field formed by a voltage difference between two electrodes and adjusting a light transmittance, and the storage capacitor $C_{st}$ stores a voltage difference between the pixel electrode $V_{LC}$ and the common electrode $V_{COM}$.

Furthermore, the first switching element S1 of the pixel memory 131b is turned on when a high level first clock voltage is applied to its control electrode to apply a high level data voltage $V_{DATA}$ applied from the pixel electrode $V_{LC}$ to the second electrode of the memory switching element MS. The memory switching element MS is turned off when a high level gate voltage $V_{GATE}$ is applied to its control electrode.

Next, in the second delay period D2, a low level gate voltage $V_{GATE}$ is applied to the pixel 131a and the pixel memory 131b, and a high level first clock voltage and a low level second clock voltage are applied to the pixel memory 131b.

A low level gate voltage $V_{GATE}$ is applied to the control electrode of the pixel switching element PS, so that the pixel 131a is turned off, and a low level gate voltage $V_{GATE}$ is applied to the control electrode of the memory switching element MS, so that the pixel memory 131b is turned on. The first switching element S1 of the pixel memory 131b is turned on when a high level first clock voltage is applied to its control electrode. Furthermore, the second switching element S2 is turned off when a low level second clock voltage is applied to its control electrode.

When the memory switching element MS and the first switching element S1 of the pixel memory 131b are turned on, a high level data voltage $V_{DATA}$ applied to the pixel electrode $V_{LC}$ is applied to the second input terminal of the first NAND gate NAND1 to output a low level voltage, and the second NAND gate NAND2 receives the low level voltage to output a high level voltage to apply to the first NAND gate NAND1. That is, a voltage is alternated in such a manner that it is changed from low level to high level and vice versa, and a high level pixel voltage from the output terminal of the second NAND gate NAND2 is outputted to the pixel electrode $V_{LC}$. Here, the common electrode $V_{COM}$ is electrically coupled to the second clock line CLK2 that has a voltage value of low level in the same manner as a common voltage $V_{com}$ of the first delay period D1, and a second clock voltage is applied to the common electrode $V_{COM}$. A high level pixel voltage is applied to the pixel electrode $V_{LC}$, and a low level second clock voltage is applied to the common electrode $V_{COM}$.

The liquid crystal LC cell can display different gray levels by varying the arrangement state of a liquid crystal cell in accordance with a lateral electric field formed by a voltage difference between the pixel electrode $V_{LC}$ and the common electrode $V_{COM}$ to adjust a light transmittance.

Furthermore, when the pixel 131a is turned off, the common voltage and the data voltage are not applied to the pixel 131a, and the liquid crystal LC cell is operated by the pixel memory 131b. Therefore, power consumption of a circuit module for operating a driving part is reduced because the liquid crystal LC cell of the pixel 131a can operate without receiving the common voltage and the data voltage, and thus the total power consumption of the liquid crystal display is reduced.

After the second delay period D2, the pixel 131a does not operate, and the liquid crystal LC cell operates while the pixel memory 131b outputs a voltage to be applied to the pixel electrode $V_{LC}$. The second delay period D2 is a period for inputting and outputting a voltage from the pixel electrode $V_{LC}$ to the pixel memory 131b.

Next, in the second drive period T2, a low level gate voltage $V_{GATE}$ from the gate line is applied to the pixel 131a and the pixel memory 131b, and a low level first clock voltage from the first clock line CLK1 and a high level second clock voltage from the second clock line CLK2 are applied to the pixel memory 131b. Here, the pixel switching element PS of the pixel 131a is turned off when a low level gate voltage $V_{GATE}$ is applied to its control electrode, and thus the pixel 131a does not operate.

The memory switching element MS of the pixel memory 131b is turned on when a low level gate voltage $V_{GATE}$ is applied to its control electrode. The first switching element S1 of the pixel memory 131b is turned off when a low level first clock voltage is applied to its control electrode.

Furthermore, the second switching element S2 is turned on when a high level second clock voltage is applied to its control electrode. When the second switching element S2 is turned on, the second switching element S2 of the pixel memory 131b outputs a low level pixel voltage from the pixel electrode $V_{LC}$ to the output terminal of the first NAND gate NAND1, and the voltages between the first NAND gate NAND1 and the second NAND gate NAND2 alternate between low level and high level.

Furthermore, the memory switching element MS of the pixel memory 131b is turned on, so that voltages between the first NAND gate NAND1 and the second NAND gate NAND2 continuously alternate. That is, a low level pixel voltage is applied to the second input terminal of the second NAND gate NAND2 that outputs a high level pixel voltage and applies it to the first NAND gate NAND1, and the first NAND gate NAND1 receives a high level pixel voltage and outputs a low level pixel voltage to apply it to the second NAND gate NAND2.

Here, the common electrode $V_{com}$ is electrically coupled to the second clock line CLK2 that has the same voltage value as the common voltage $V_{com}$ of the first delay period D1, the first drive period T1 and the second delay period D2, and a second clock voltage is applied to the common electrode $V_{COM}$. A low level pixel voltage is applied to the pixel electrode $V_{LC}$, and a high level second clock voltage is applied to the common electrode $V_{COM}$.

The liquid crystal LC cell can display different gray levels by varying the arrangement state of a liquid crystal cell in accordance with a lateral electric field formed by a voltage difference between the pixel electrode $V_{LC}$ and the common electrode $V_{COM}$ by adjusting a light transmittance of the liquid crystal LC cell. The second drive period T2 is a period for outputting a voltage from the pixel memory 131b to the pixel electrode $V_{LC}$.

Finally, in the third drive period T3, a low level gate voltage $V_{GATE}$ from the gate line is applied to the pixel 131a and the pixel memory 131b, and a high level first clock voltage from the first clock line CLK1 and a low level second clock voltage from the second clock line CLK2 are applied to the pixel memory 131b. Here, the pixel switching element PS of the pixel 131a is turned off when a low level gate voltage $V_{GATE}$ is applied to its control electrode, and thus the pixel 131a does not operate.

The memory switching element MS of the pixel memory 131b is turned on when a low level gate voltage $V_{GATE}$ is applied to its control electrode. The first switching element S1 of the pixel memory 131b is turned on when a high level first clock voltage is applied to its control electrode. Furthermore, the second switching element S2 is turned off when a low level second clock voltage is applied to its control electrode. When the first switching element S1 is turned on, the first switching element S1 of the pixel memory 131b outputs a high level pixel voltage to the output terminal of the second NAND gate NAND2, and a voltage from the output terminal of the second NAND gate NAND2 is outputted to the pixel electrode $V_{LC}$ through the first switching element S1. Furthermore, when the memory switching element MS is also turned on, the voltages between the first NAND gate NAND1 and the second NAND gate NAND2 alternate between high level and low level.

Furthermore, the memory switching element MS of the pixel memory 131b is turned on, so that voltages between the first NAND gate NAND1 and the second NAND gate NAND2 continuously alternate between high level and low level. That is, a high level pixel voltage is applied to the second input terminal of the first NAND gate NAND1 that outputs a low level pixel voltage and applies it to the second NAND gate NAND2, and the second NAND gate NAND2 receives a low level pixel voltage and outputs a high level pixel voltage to apply it to the first NAND gate NAND1.

Here, the common electrode $V_{COM}$ is electrically coupled to the second clock line CLK2 that has the same voltage value as the common voltage $V_{com}$ during the first delay period D1, the first drive period T1, the second delay period D2 and the second drive period T2, and a second clock voltage is applied to the common electrode $V_{COM}$. A high level pixel voltage is applied to the pixel electrode $V_{LC}$, and a low level second clock voltage is applied to the common electrode $V_{COM}$.

The liquid crystal LC cell can display different gray levels by varying the arrangement state of a liquid crystal cell in accordance with a lateral electric field formed by a voltage difference between the pixel electrode $V_{LC}$ and the common electrode $V_{COM}$ to adjust a light transmittance of the liquid crystal LC cell. The third drive period T3 is a period for outputting a voltage from the pixel memory 131b to the pixel electrode $V_{LC}$.

The timing diagram of the pixel memory 131b of FIG. 4b can include a first drive period T1, a second drive period T2 and a third drive period T3, and can further include a first delay period D1 and a second delay period D2. Comparing the timing diagram of FIG. 4b with the timing diagram of FIG. 4a, a voltage applied to the pixel electrode $V_{LC}$ is changed from low level to high level and from high level to low level (i.e., inverted), and a voltage applied to the common electrode $V_{COM}$ is changed from high level to low level and from low level to high level (e.g., inverted).

When the pixel 131a is turned off and the pixel memory 131b inputs and outputs a pixel voltage, the sequence of the pixel voltage applied to the pixel memory 131b is alternated, and a common voltage $V_{com}$ applied to the liquid crystal LC cell of the pixel 131a is changed from a second clock voltage applied from the second clock line CLK2 to a first clock voltage applied from the first clock line CLK1. That is, the pixel 131a and the pixel memory 131b operate in the same manner as the timing diagram of FIG. 4a except that the voltage level is changed (i.e., inverted).

Figure 5:
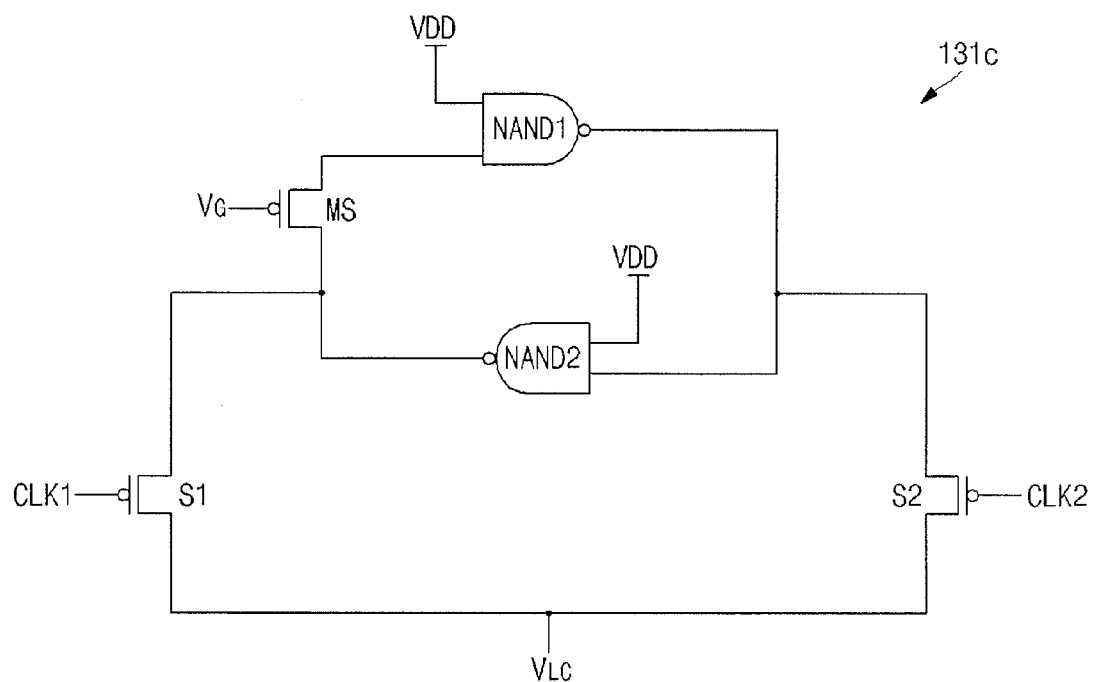
FIG. 5 is a circuit diagram illustrating a pixel memory of a liquid crystal display according to another exemplary embodiment of the present invention.

Referring to FIG. 5, a circuit diagram of a pixel memory 131c of a liquid crystal display according to another exemplary embodiment of the present invention is illustrated.

As illustrated in FIG. 5, a pixel memory 131c has the same structure as the pixel memory 131b of FIG. 3 except the first switching element S1 and the second switching element S2. The first switching element S1 and the second switching element S2 of FIG. 5 are turned on when a low level clock voltage is applied to their control electrodes. That is, the first switching element S1 and the second switching element S2 may be P-type transistors that are turned on when a low level clock voltage is applied to their control electrodes.

Figure 6B:
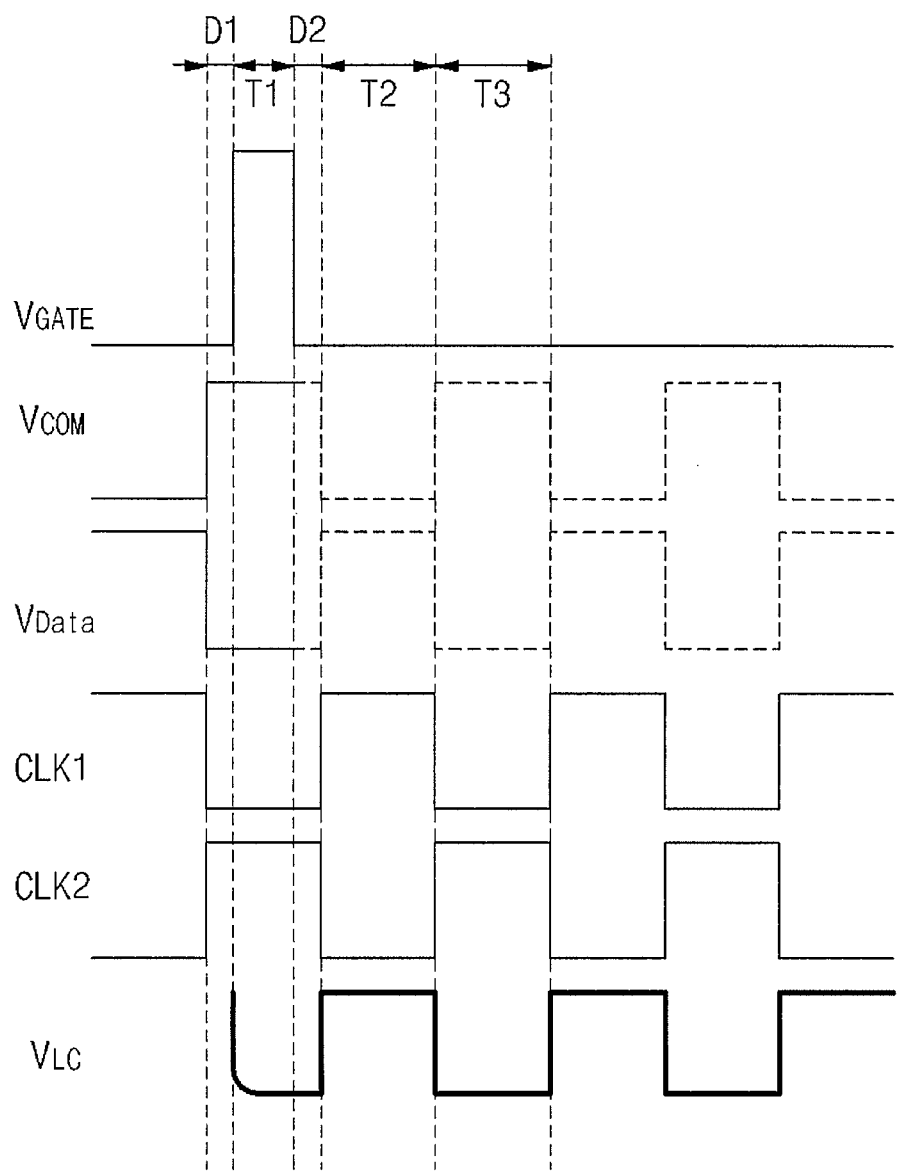

Referring to FIGS. 6a and 6b, timing diagrams of the pixel 131a and the pixel memory 131c of the liquid crystal display of FIGS. 2 and 5 are illustrated.

As illustrated in FIGS. 6a and 6b, the timing diagrams of the pixel 131a and the pixel memory 131c show that they operate in the same manner as the pixel 131a and the pixel memory 131b of FIGS. 4a and 4b except that the first switching element S1 and the second switching element S2 are turned on when a low level clock voltage is applied to their control electrodes. That is, the timing diagrams of the pixel 131a and the pixel memory 131c show that they operate in the same manner as the pixel 131a and the pixel memory 131b of FIGS. 4a and 4b except that the first switching element S1 and the second switching element S2 are turned on when a low level clock voltage is applied to their respective control electrodes and the pixel memory 131c inputs and outputs a pixel voltage.

Figure 7:
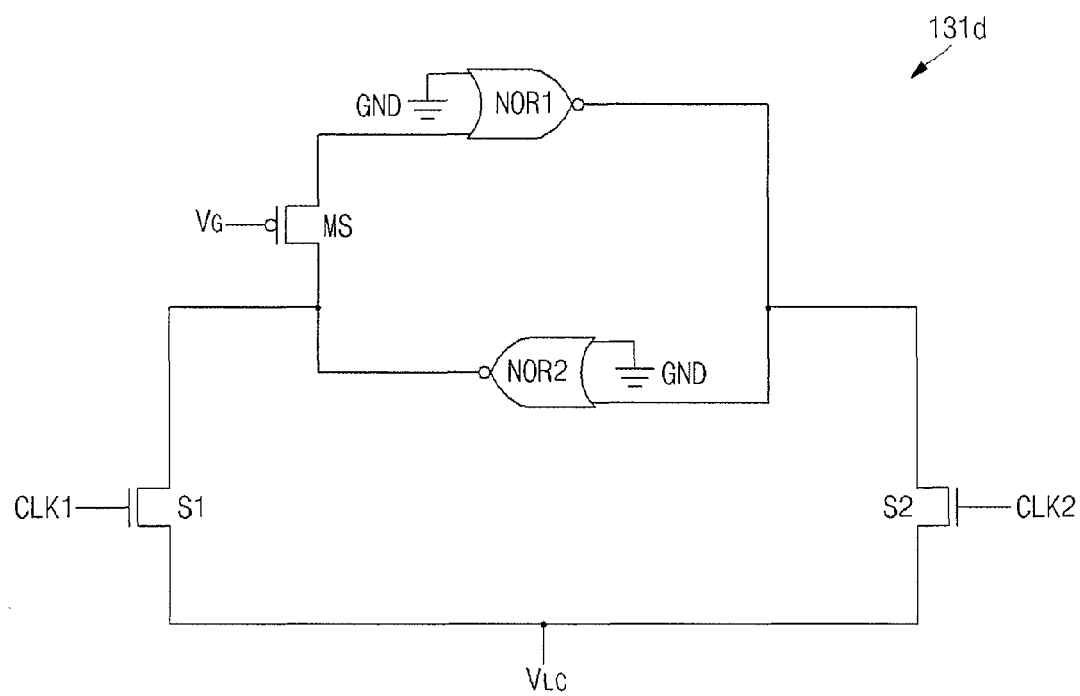
FIG. 7 is a circuit diagram illustrating a pixel memory of a liquid crystal display according to yet another exemplary embodiment of the present invention.

Referring to FIG. 7, a circuit diagram of a pixel memory 131d of a liquid crystal display according to another exemplary embodiment of the present invention is illustrated.

As illustrated in FIG. 7, a pixel memory 131d of a liquid crystal display includes a first NOR gate NOR1, a second NOR gate NOR2, a memory switching element MS, a first switching element S1 and a second switching element S2. A gate line that is electrically coupled to a control electrode of the memory switching element MS is electrically coupled to a control electrode of the pixel switching element PS of FIG. 2, and a pixel electrode $V_{LC}$ coupled to the first switching element S1 and the second switching element S2 is the same as the pixel electrode $V_{LC}$ coupled to the liquid crystal LC cell and the storage capacitor $C_{st}$ of FIG. 2. That is, the pixel 131a of FIG. 2 and the pixel memory 131d of FIG. 7 are electrically coupled to each other.

The memory switching element MS is illustrated as a P-channel metal oxide semiconductor (PMOS) that turns on when a low level voltage is applied to its control electrode, and the pixel switching element PS is illustrated as an N-channel metal oxide semiconductor (NMOS) that turns on when a high level voltage is applied to its control electrode, but the embodiment is not limited thereto. The pixel switching element PS is a PMOS when the memory switching element MS is an NMOS, and the pixel switching element PS is an NMOS when the memory switching element MS is a PMOS, so that they operate in opposite states when a gate voltage is applied from the gate line to their respective control electrodes.

When the pixel 131a and the pixel memory 131d display a still image for a long period of time, or when the pixel 131a does not operate and the pixel memory 131d operates in an OSD region, the pixel memory 131d operates the liquid crystal LC cell by inputting and outputting a pixel voltage to the pixel electrode $V_{LC}$. Here, other driving parts except the gate driver 110 that is electrically coupled to the pixel 131a do not operate because the pixel 131a does not operate, and thus power consumption is reduced.

Referring to the first NOR gate NOR1, a first input terminal is electrically coupled to a ground GND, a second input terminal is electrically coupled to a first electrode of the memory switching element MS, and an output terminal is electrically coupled to a second input terminal of the second NOR gate NOR2 and a first electrode of the second switching element S2. The first NOR gate NOR1 outputs an inverted voltage of a voltage received from the memory switching element MS and transfers it to the second input terminal of the second NOR gate NOR2 and the first electrode of the second switching element S2. That is, the first NOR gate NOR1 outputs a low level voltage to its output terminal when a high level voltage is applied to its second input terminal, and outputs a high level voltage to its output terminal when a low level voltage is applied to its second input terminal, and thus transfers the high level voltage to the second input terminal of the second NOR gate NOR2 and the first electrode of the second switching element S2.

Referring to the second NOR gate NOR2, a first input terminal is electrically coupled to a ground GND, a second input terminal is electrically coupled to the output terminal of the first NOR gate NOR1 and the first electrode of the second switching element S2, and an output terminal is electrically coupled to the second electrode of the memory switching element MS and the first electrode of the first switching element S1.

The second NOR gate NOR2 outputs an inverted voltage of a voltage received from the first NOR gate NOR1 and transfers it to the second electrode of the memory switching element MS and the first electrode of the first switching element S1. That is, the second NOR gate NOR2 outputs a low level voltage to its output terminal when a high level voltage is applied to its second input terminal, and outputs a high level voltage to its output terminal when a low level voltage is applied to its second input terminal, and thus transfers its output voltage to the second electrode of the memory switching element MS and the first electrode of the first switching element S1.

Furthermore, the second NOR gate NOR2 outputs an inverted voltage of a pixel voltage received through the second switching element S2 and transfers it to the second electrode of the memory switching element MS. That is, the second NOR gate NOR2 outputs a low level voltage to its output terminal when a high level pixel voltage is applied to its second input terminal, and outputs a high level voltage to its output terminal when a low level pixel voltage is applied to its second input terminal, and thus transfers its output voltage to the second electrode of the memory switching element MS.

When the memory switching element MS between the first NOR gate NOR1 and the second NOR gate NOR2 is turned on, a voltage between the first NOR gate NOR1 and the second NOR gate NOR2 alternates between high level and low level every time the voltage passes through one of the NOR gates. For example, when a high level voltage is applied to the second input terminal of the first NOR gate NOR1, the first NOR gate NOR1 outputs a low level voltage and applies it to the second input terminal of the second NOR gate NOR2, and the second NOR gate NOR2 outputs a high level voltage to its output terminal and applies its output voltage to the first NOR gate NOR1, and thus a voltage is alternated between high level and low level.

Referring to the memory switching element MS, a control electrode is electrically coupled to the gate line, a first electrode is electrically coupled to the second input terminal of the first NOR gate NOR1, and a second electrode is electrically coupled to the output terminal of the second NOR gate NOR2 and the first electrode of the first switching element S1.

The gate line is the same as the gate line applied to the pixel 131a of the liquid crystal display, and a voltage that is the same as a gate voltage applied to the control electrode of the pixel switching element PS of the pixel 131a is also applied to the control electrode of the memory switching element MS. The memory switching element MS is turned on when a low level gate voltage is applied to its control electrode and transfers a voltage received from the output terminal of the second NOR gate NOR2 to the second input terminal of the first NOR gate NOR1.

Furthermore, the memory switching element MS transfers a pixel voltage received through the first switching element S1 to the second input terminal of the first NOR gate NOR1. That is, the memory switching element MS transfers a pixel voltage received from the first switching element S1 to the second input terminal of the first NOR gate NOR1 when the first switching element S1 is turned on. When the first switching element S1 is turned off, a voltage between the first NOR gate NOR1 and the second NOR gate NOR2 alternates between high level and low level when the first switching element S1 is turned off.

Referring to the first switching element S1, a first electrode is electrically coupled to the second electrode of the memory switching element MS and the output terminal of the second NOR gate NOR2, a second electrode is electrically coupled to the pixel electrode $V_{LC}$, and a control electrode is electrically coupled to a first clock line CLK1.

The pixel electrode $V_{LC}$ is electrically coupled to the pixel electrode $V_{LC}$ (shown in FIG. 2) of the pixel 131a of the liquid crystal display for applying a pixel voltage to the pixel electrode $V_{LC}$ of the liquid crystal LC cell. The first switching element S1 is turned on when a high level first clock voltage is applied to its control electrode to transfer a pixel voltage applied from the pixel electrode $V_{LC}$ to the memory switching element MS and transfers a voltage received from the output terminal of the second NOR gate NOR2 to the pixel electrode $V_{LC}$. That is, the first switching element S1 inputs and outputs a pixel voltage to the pixel electrode $V_{LC}$. The first switching element S1 is supplied with an enable voltage when a high level clock voltage is applied to its control electrode, and thus the first switching element S1 is turned on. That is, the first switching element S1 may be an N-type transistor.

Referring to the second switching element S2, a first electrode is electrically coupled to the output terminal of the first NOR gate NOR1 and the second input terminal of the second NOR gate NOR2, a second electrode is electrically coupled to the pixel electrode $V_{LC}$, and a control electrode is electrically coupled to a second clock line CLK2.

The pixel electrode $V_{LC}$ is electrically coupled to the pixel electrode $V_{LC}$ (shown in FIG. 2) of the pixel 131a of the liquid crystal display for applying a pixel voltage to the pixel electrode $V_{LC}$ of the liquid crystal LC cell. The second switching element S2 is turned on when a high level second clock voltage is applied to its control electrode to transfer a pixel voltage applied from the pixel electrode $V_{LC}$ to the second input terminal of the second NOR gate NOR2 and transfer a pixel voltage applied from the output terminal of the first NOR gate NOR1 to the pixel electrode $V_{LC}$. That is, the second switching element S2 inputs and outputs a pixel voltage to the pixel electrode $V_{LC}$.

The second switching element S2 is supplied with an enable voltage when a high level clock voltage is applied to its control electrode, and thus the second switching element S2 is turned on. That is, the second switching element S2 may be an N-type transistor that is the same as the first switching element S1.

Figure 8B:
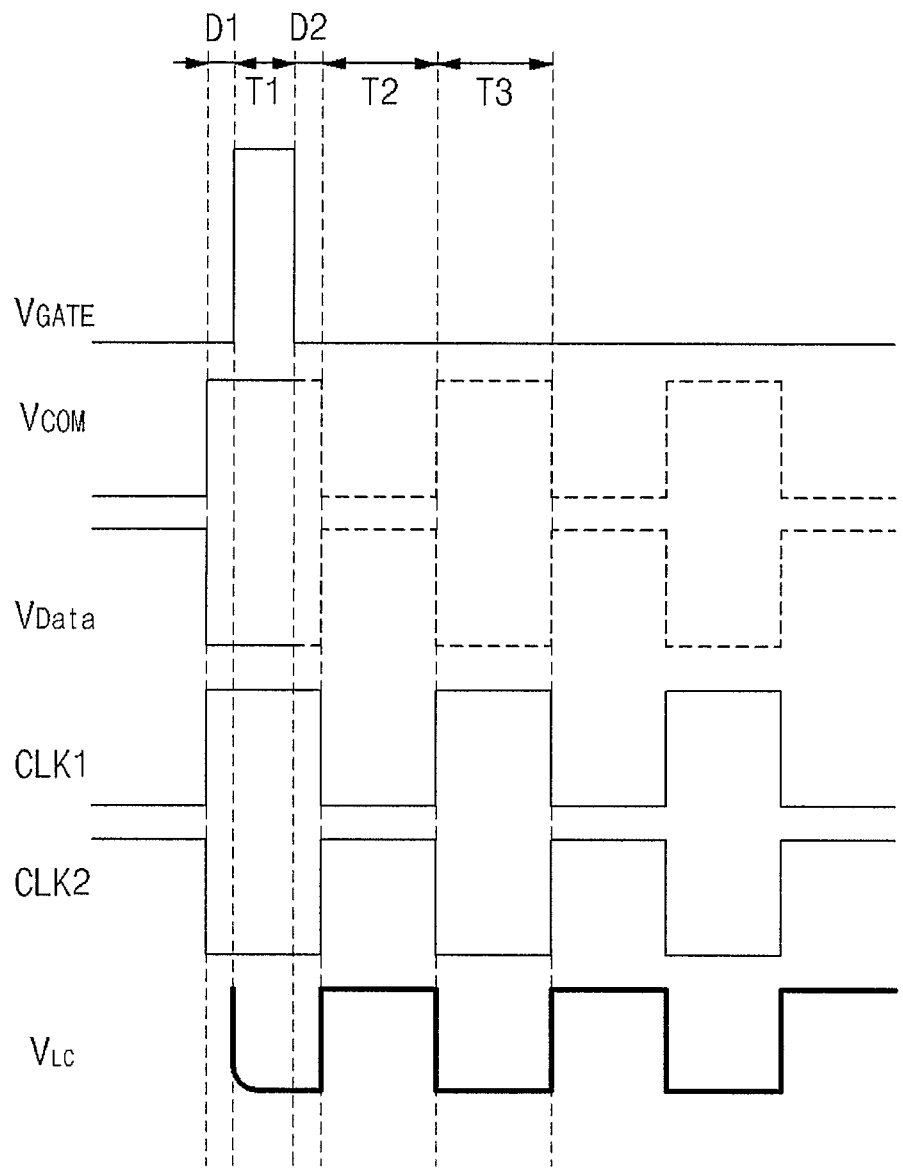

Referring to FIGS. 8a and 8b, there are illustrated timing diagrams of the pixel 131a and the pixel memory 131d of the liquid crystal display of FIGS. 2 and 7.

As illustrated in FIG. 8a, the timing diagram of the pixel 131a and the pixel memory 131d can include a first drive period T1, a second drive period T2 and a third drive period T3, and can further include a first delay period D1 and a second delay period D2.

First, in the first delay period D1, a low level gate voltage $V_{GATE}$ is applied to the pixel 131a and the pixel memory 131d, a low level common voltage $V_{com}$ and a high level data voltage $V_{DATA}$ are applied to the pixel 131a, and a high level first clock voltage and a low level second clock voltage are applied to the pixel memory 131d.

In the first delay period D1, a low level gate voltage $V_{GATE}$ is applied to the control electrode of the pixel switching element PS, so that the pixel 131a is turned off, and a low level gate voltage $V_{GATE}$ is applied to the control electrode of the memory switching element MS, so that the pixel memory 131d is turned on. The first switching element S1 of the pixel memory 131d is turned on when a high level first clock voltage is applied to its control electrode. Furthermore, the second switching element S2 is turned off when a low level second clock voltage is applied to its control electrode.

The first delay period D1 is a period during which a common voltage $V_{com}$ and a data voltage $V_{DATA}$ are constantly maintained, and a gate voltage $V_{GATE}$ is changed from low level to high level. This is for ensuring a margin to clock skew or delay.

Next, in the first drive period T1, a high level gate voltage $V_{GATE}$ is applied to the pixel 131a and the pixel memory 131d, a low level common voltage $V_{com}$ and a high level data voltage $V_{DATA}$ are applied to the pixel 131a, and a high level first clock voltage and a low level second clock voltage are applied to the pixel memory 131d.

The pixel switching element PS of the pixel 131a is turned on when a high level gate voltage $V_{GATE}$ is applied to its control electrode. When the pixel switching element PS is turned on, it transfers a high level data voltage $V_{DATA}$ received from its first electrode to the pixel electrode $V_{LC}$. Here, a high level data voltage $V_{DATA}$ is applied to the pixel electrode $V_{LC}$, and a low level common voltage $V_{com}$ is applied to the common electrode $V_{COM}$, so that the liquid crystal LC cell can display different gray levels by varying the arrangement state of a liquid crystal cell in accordance with a lateral electric field formed by a voltage difference between two electrodes by adjusting its light transmittance, and the storage capacitor $C_{st}$ stores a voltage difference between the pixel electrode $V_{LC}$ and the common electrode $V_{COM}$.

Furthermore, the first switching element S1 of the pixel memory 131d is turned on when a high level first clock voltage is applied to its control electrode to apply a high level data voltage $V_{DATA}$ received from the pixel electrode $V_{LC}$ to the second electrode of the memory switching element MS.

The memory switching element MS is turned off when a high level gate voltage $V_{GATE}$ is applied to its control electrode.

Next, in the second delay period D2, a low level gate voltage $V_{GATE}$ is applied to the pixel 131a and the pixel memory 131d, and a high level first clock voltage and a low level second clock voltage are applied to the pixel memory 131d.

The low level gate voltage $V_{GATE}$ is applied to the control electrode of the pixel switching element PS, so that the pixel 131a is turned off. And the low level gate voltage $V_{GATE}$ is applied to the control electrode of the memory switching element MS, so that the pixel memory 131d is turned on. The first switching element S1 of the pixel memory 131d is turned on when a high level first clock voltage is applied to its control electrode. Furthermore, the second switching element S2 is turned off when a low level second clock voltage is applied to its control electrode.

When the memory switching element MS and the first switching element S1 of the pixel memory 131d are turned on, a high level data voltage $V_{DATA}$ received from the pixel electrode $V_{LC}$ is applied to the second input terminal of the first NOR gate NOR1 that outputs a low level voltage, and the second NOR gate NOR2 receives the low level voltage and outputs a high level voltage to apply it to the first NOR gate NOR1. That is, a voltage between the first NOR gate NOR1 and the second NOR gate NOR2 is alternated between low level and high level, and a high level pixel voltage received from the output terminal of the second NOR gate NOR2 is outputted to the pixel electrode $V_{LC}$. Here, the common electrode $V_{COM}$ is electrically coupled to the second clock line CLK2 that has a low level voltage value in the same manner as the common voltage $V_{com}$ of the first delay period D1, and a second clock voltage is applied to the common electrode.

The high level pixel voltage is applied to the pixel electrode $V_{LC}$, and a low level second clock voltage is applied to the common electrode $V_{COM}$. The liquid crystal LC cell can display different gray levels by varying the arrangement state of a liquid crystal cell in accordance with a lateral electric field formed by a voltage difference between the pixel electrode $V_{LC}$ and the common electrode $V_{COM}$ to adjust its light transmittance.

Furthermore, when the pixel 131a is turned off, a common voltage $V_{com}$ and a data voltage $V_{DATA}$ that have been applied to the pixel 131a are not applied to the pixel 131a, and the liquid crystal LC cell is operated by the pixel memory 131d. Power consumption of a circuit module for operating a driving part is reduced because the liquid crystal LC cell of the pixel 131a can operate without receiving a common voltage $V_{com}$ and a data voltage $V_{DATA}$, and thus the total power consumption of the liquid crystal display is reduced. After the second delay period D2, the pixel 131a does not operate, and the liquid crystal LC cell operates while the pixel memory 131d outputs a voltage to be applied to the pixel electrode $V_{LC}$. The second delay period D2 is a period for inputting and outputting a voltage from the pixel electrode $V_{LC}$ to the pixel memory 131b.

Next, in the second drive period T2, a low level gate voltage $V_{GATE}$ from the gate line is applied to the pixel 131a and the pixel memory 131d, and a low level first clock voltage from the first clock line CLK1 and a high level second clock voltage from the second clock line CLK2 are applied to the pixel memory 131d.

Here, the pixel switching element PS of the pixel 131a is turned off when a low level gate voltage $V_{GATE}$ is applied to its control electrode, and thus the pixel 131a does not operate. The memory switching element MS of the pixel memory 131d is turned on when a low level gate voltage $V_{GATE}$ is applied to its control electrode. The first switching element S1 of the pixel memory 131d is turned off when a low level first clock voltage is applied to its control electrode. Furthermore, the second switching element S2 is turned on when a high level second clock voltage is applied to its control electrode.

When turned on, the second switching element S2 of the pixel memory 131d outputs a low level pixel voltage received from the output terminal of the first NOR gate NOR1 to the pixel electrode $V_{LC}$ through the second switching element S2, and voltages between the first NOR gate NOR1 and the second NOR gate NOR2 alternate between high level and low level, Furthermore, the memory switching element MS of the pixel memory 131d is turned on, so that voltages between the first NOR gate NOR1 and the second NOR gate NOR2 continuously alternate between high level and low level. That is, a low level pixel voltage is applied to the second input terminal of the second NOR gate NOR2 that outputs a high level pixel voltage and applies it to the first NOR gate NOR1, and the first NOR gate NOR1 receives a high level pixel voltage and outputs a low level pixel voltage to be applied to the second NOR gate NOR2. Here, the common electrode $V_{COM}$ is electrically coupled to the second clock line CLK2 that has the same voltage value as the common voltage $V_{com}$ of the first delay period D1, the first drive period T1 and the second delay period D2, and a second clock voltage is applied to the common electrode $V_{COM}$.

A low level pixel voltage is applied to the pixel electrode $V_{LC}$, and a high level second clock voltage is applied to the common electrode $V_{COM}$. The liquid crystal LC cell can display different gray levels by varying the arrangement state of a liquid crystal cell in accordance with a lateral electric field formed by a voltage difference between the pixel electrode $V_{LC}$ and the common electrode $V_{COM}$ to adjust its light transmittance. The second drive period T2 is a period for outputting a voltage from the pixel memory 131d to the pixel electrode $V_{LC}$.

Finally, in the third drive period T3, a low level gate voltage $V_{GATE}$ from the gate line is applied to the pixel 131a and the pixel memory 131d, a high level first clock voltage from the first clock line CLK1 and a low level second clock voltage from the second clock line CLK2 are applied to the pixel memory 131d. Here, the pixel switching element PS of the pixel 131a is turned off when a low level gate voltage $V_{GATE}$ is applied to its control electrode, and thus the pixel 131a does not operate.

The memory switching element MS of the pixel memory 131d is turned on when a low level gate voltage $V_{GATE}$ is applied to its control electrode. The first switching element S1 of the pixel memory 131d is turned on when a high level first clock voltage is applied to its control electrode. Furthermore, the second switching element S2 is turned off when a low level second clock voltage is applied to its control electrode. When turned on, the first switching element S1 of the pixel memory 131d outputs a high level pixel voltage received from the output terminal of the second NOR gate NOR2 to the pixel electrode $V_{LC}$ through the first switching element S1, and voltages between the first NOR gate NOR1 and the second NOR gate NOR2 alternate between low level and high level.

Furthermore, the memory switching element MS of the pixel memory 131d is turned on, so that voltages between the first NOR gate NOR1 and the second NOR gate NOR2 continuously alternate between high level and low level. That is, a high level pixel voltage is applied to the second input terminal of the first NOR gate NOR1 that outputs a low level pixel voltage to be applied to the second NOR gate NOR2, and the second NOR gate NOR2 receives a low level pixel voltage and outputs a high level pixel voltage to be applied to the first NOR gate NOR1. Here, the common electrode $V_{COM}$ is electrically coupled to the second clock line CLK2 that has the same voltage value as the common voltage $V_{com}$ of the first delay period D1, the first drive period T1, the second delay period D2 and the second drive period T2, and a second clock voltage is applied to the common electrode $V_{COM}$.

A high level pixel voltage is applied to the pixel electrode $V_{LC}$, and a low level second clock voltage is applied to the common electrode $V_{COM}$. The liquid crystal LC cell can display different gray levels by varying the arrangement state of a liquid crystal cell in accordance with a lateral electric field formed by a voltage difference between the pixel electrode $V_{LC}$ and the common electrode $V_{COM}$ to adjust its light transmittance. The third drive period T3 is a period for outputting a voltage from the pixel memory 131d to the pixel electrode $V_{LC}$.

The timing diagram of the pixel memory 131d of FIG. 8b can include a first drive period T1, a second drive period T2 and a third drive period T3, and can further include a first delay period D1 and a second delay period D2. Comparing the timing diagram of FIG. 8b with the timing diagram of FIG. 8a, a voltage applied to the pixel electrode $V_{LC}$ is changed from a low level to a high level and from a high level to a low level (i.e., inverted), and a voltage applied to the common electrode $V_{COM}$ is changed from a high level to a low level and from a low level to a high level (i.e., inverted). When the pixel 131a is turned off and the pixel memory 131d inputs and outputs (i.e., turned on), the sequence of a pixel voltage applied to the pixel memory 131d is changed (i.e., inverted), and a common voltage $V_{com}$ applied to the liquid crystal LC cell of the pixel 131a is changed from a second clock voltage applied from the second clock line CLK2 to a first clock voltage applied from the first clock line CLK1 (i.e., inverted). That is, the pixel 131a and the pixel memory 131d operate in the same manner as the timing diagram of FIG. 4a except that a voltage level is inverted.

Figure 9:
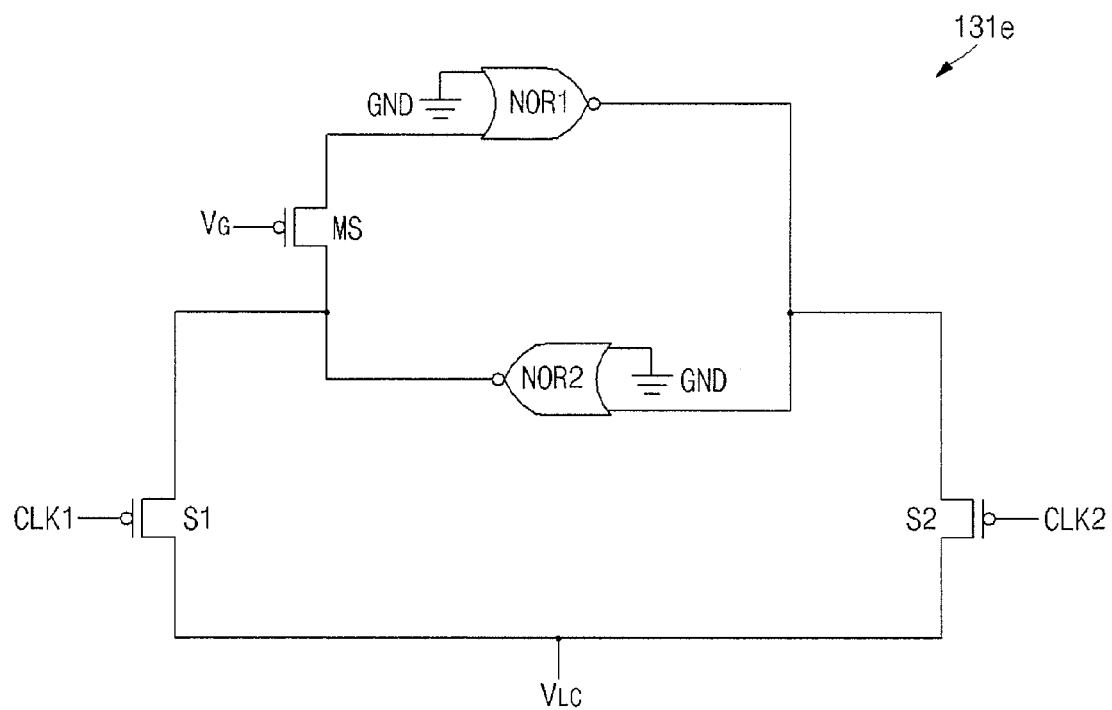
FIG. 9 is a circuit diagram illustrating a pixel memory of a liquid crystal display according to yet another exemplary embodiment of the present invention.

Referring to FIG. 9, there is illustrated a circuit diagram illustrating a pixel memory 131e of a liquid crystal display according to another exemplary embodiment of the present invention.

As illustrated in FIG. 9, the pixel memory 131e has the same structure as the pixel memory 131d of FIG. 7 except the first switching element S1 and the second switching element S2. The first switching element S1 and the second switching element S2 of FIG. 9 are turned on when a low level clock voltage is applied to their control electrodes. That is, the first switching element S1 and the second switching element S2 may be P-type transistors that are turned on when a low level clock voltage is applied to the control electrodes.

Referring to FIGS. 10a and 10b, there are illustrated timing diagrams of the pixel and the pixel memory of the liquid crystal display of FIGS. 2 and 9.

As illustrated in FIGS. 10a and 10b, the timing diagram of the pixel 131a and the pixel memory 131e operates in the same manner as the pixel 131a and the pixel memory 131d of FIGS. 8a and 8b except that the first switching element S1 and the second switching element S2 are turned on when a low level clock voltage is applied to the control electrodes. That is, the timing diagram of the pixel 131a and the pixel memory 131e operates in the same manner as the pixel 131a and the pixel memory 131d of FIGS. 8a and 8b except that the first switching element S1 and the second switching element S2 are turned on and the pixel memory 131e inputs and outputs from/to the pixel electrode $V_{LC}$ when a low level clock voltage is applied.

As described above, according to the exemplary embodiments of the present invention, power consumption of a liquid crystal display can be reduced by storing a pixel voltage in a pixel memory located in an OSD (On Screen Display) region of a liquid crystal panel for displaying a still image for a long period of time and driving a liquid crystal cell by the stored pixel voltage.

And, reduced power consumption of a circuit element for alternating a voltage between low level and high level so as to store a voltage in a pixel memory can be achieved by using a NAND gate or a NOR gate as the circuit element.

Although exemplary embodiments of the present invention have been described for illustrative purpose, those skilled in the art will appreciate that various modifications and changes thereof are possible without departing from the scope and spirit of the present invention, and all modifications and changes are intended to be included within the description of the claims and their equivalents.

What is claimed is:

1. A liquid crystal display comprising a data driver, a gate driver and a liquid crystal display panel having a plurality of pixels and a plurality of pixel memories, each of the plurality of pixel memories comprising:
a first NOR gate having a first input terminal electrically coupled to a ground and configured to output an inverted voltage of a voltage applied to its second input terminal;
a second NOR gate having a first input terminal electrically coupled to the ground, configured to receive at its second input terminal a voltage outputted from the first NOR gate, and configured to output to its output terminal an inverted voltage of the voltage outputted from the first NOR gate;
a memory switching element having a first electrode electrically coupled to the second input terminal of the first NOR gate, and a second electrode electrically coupled to the output terminal of the second NOR gate;
a first switching element electrically coupled between the memory switching element and a pixel electrode; and
a second switching element electrically coupled between the pixel electrode and an output terminal of the first NOR gate.

2. The liquid crystal display of claim 1, wherein the output terminal of the first NOR gate is electrically coupled to the second input terminal of the second NOR gate and a first electrode of the second switching element.

3. The liquid crystal display of claim 1, wherein the second input terminal of the second NOR gate is electrically coupled to the output terminal of the first NOR gate and a first electrode of the second switching element, and the output terminal of the second NOR gate is electrically coupled to a first electrode of the first switching element and the second electrode of the memory switching element.

4. The liquid crystal display of claim 1, wherein a control electrode of the memory switching element is electrically coupled to a gate line, and the second electrode of the memory switching element is electrically coupled to the output terminal of the second NOR gate and a first electrode of the first switching element.

5. The liquid crystal display of claim 1, wherein a first electrode of the first switching element is electrically coupled to the second electrode of the memory switching element and the output terminal of the second NOR gate, a control electrode of the first switching element is electrically coupled to a first clock line, and a second electrode of the first switching element is electrically coupled to the pixel electrode.

6. The liquid crystal display of claim 1, wherein a first electrode of the second switching element is electrically coupled to the output terminal of the first NOR gate and the second input terminal of the second NOR gate, a control electrode of the second switching element is electrically coupled to a second clock line, and a second electrode of the second switching element is electrically coupled to the pixel electrode.

7. The liquid crystal display of claim 1, each of the plurality of pixels comprising:
- a liquid crystal cell having a first electrode electrically coupled to the pixel electrode and a second electrode electrically coupled to a common electrode;
- a storage capacitor electrically coupled between the pixel electrode and the common electrode; and
- a pixel switching element electrically coupled between the pixel electrode and a data line and having a control electrode electrically coupled to a gate line.

* * * * *